(12) United States Patent
Pi et al.

(10) Patent No.: US 7,072,750 B2
(45) Date of Patent: Jul. 4, 2006

(54) METHOD AND APPARATUS FOR REJECTION OF SPEECH RECOGNITION RESULTS IN ACCORDANCE WITH CONFIDENCE LEVEL

(75) Inventors: Xiaobo Pi, Beijing (CN); Ying Jia, Beijing (CN)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 10/332,650

(22) PCT Filed: May 8, 2001

(86) PCT No.: PCT/CN01/00685

§ 371 (c)(1),
(2), (4) Date: Jun. 10, 2003

(87) PCT Pub. No.: WO02/091358

PCT Pub. Date: Nov. 14, 2002

(65) Prior Publication Data

US 2004/0015357 A1    Jan. 22, 2004

(51) Int. Cl.
*G06F 7/00*    (2006.01)

(52) U.S. Cl. .......................................................... 701/36
(58) Field of Classification Search ..................... None
See application file for complete search history.

(56) References Cited

U.S. PATENT DOCUMENTS

| 4,394,538 A | 7/1983 | Warren et al. ............... 704/252 |
| 5,404,422 A | 4/1995 | Sakamoto et al. ........... 704/232 |
| 5,509,103 A | 4/1996 | Wang .......................... 704/232 |
| 5,749,072 A | 5/1998 | Mazurkiewicz et al. .... 704/275 |
| 6,092,042 A | 7/2000 | Iso ............................. 704/240 |

FOREIGN PATENT DOCUMENTS

JP    03099957 A    *   4/1991

* cited by examiner

*Primary Examiner*—Yonel Beaulieu
(74) *Attorney, Agent, or Firm*—Blakely, Sokoloff, Taylor & Zafman LLP

(57) ABSTRACT

An automatic speech recognition system for continuous speech recognition of vocabulary words for an autoattendent system proving hand-free telephone calling and utilizing a vocabulary comprising numbers or names of people to be called using known techniques for automatic speech recognition models of word sequencing resulting in high confidence levels of recognition.

16 Claims, 2 Drawing Sheets

METHOD AND APPARATUS FOR REJECTION OF SPEECH RECOGNITION RESULTS IN ACCORDANCE WITH CONFIDENCE LEVEL

BACKGROUND OF THE INVENTION

The present invention relates to automatic speech recognition, and more particularly to an efficient system and method for continuous speech recognition of vocabulary words. A source for examples of the prior art and prior art mathematical techniques is Delaney, D. W. "Voice User Interface for Wireless Internetworking," Qualifying Examination Report," Georgia Institute of Technology; School of Electrical and Computer Engineering; Atlanta, Ga. Jan. 30, 2001.

Automatic speech recognition is an important element of wireless connectivity. Pocket-sized devices having small screens and no keyboard will be enabled by speech technology to allow users to interact with systems in a natural manner. Similarly, automatic speech recognition is necessary for an autoattendent system providing hand-free telephone calling in which a user requests that a telephone number be dialed for a person whose name is spoken by the user. While this application is but one of many for the present invention, it invokes many issues to be addressed in automatic speech recognition. The automatic speech recognition unit must include a vocabulary. In the present example, the vocabulary comprises names of people to be called. Known techniques for automatic speech recognition create stochastic models of word sequencing using training data. Then P(O|W) is estimated. This is the probability that that a particular set of acoustic observations, O corresponds to a model of a word W.

An important technique for deriving correlation of particular spoken sounds to models is the Hidden Markov Model. The Hidden Markov Model is provided to operate on outputs from audio circuitry which grabs a sample of N frames for a given sound. A language is resolved into phonemes, which are the abstract units of a phonetic system of a language that correspond to a set of similar speech sounds which are perceived to be a distinctive sound in the language. The apparatus detects phones from the samples of N frames. A phone is the acoustic manifestation of one or more linguistically-based phonemes or phoneme-like items. Each known word includes one or more phones.

Qualitatively, the decoder may be viewed as comparing one or more recognition models to features associated with an unknown utterance. The unknown utterance is recognized by the known words associated with the recognition model with which the test pattern most closely matches. Recognition model parameters are estimated from static training data stored during an initial training period.

The Hidden Markov Model (HMM) can best be described as a probabilistic state machine for the study of time series. In speech recognition, the time series is given by an observation vector O. The observation vector $O=(O_1 O_2, \ldots O_T)$ where each $O_i$ is an acoustically meaningful vector of speech data for the "i"th frame. HMMs are Markov chains whose state sequence is hidden by the output probabilities of each state. An HMM with N states is indexed as $\{s_1, s_2, \ldots, s_N\}$. A state, $s_k$ contains an output probability distribution B which describes the probability that a particular observation is produced by that state. B can be either discreet or continuous. The HMM has an initial state distribution, $\pi$, which describes the probability of starting in any one of the N states. For convenience in notation, the entire HMM can be written as $\lambda=(AB\pi)$. Speech recognition is primarily interested in the probability $P(O|\lambda)$. The results of such decoding are not certain. The result could be response to out of vocabulary words (OOVs) or another misrecognition. Such a misrecognition will generate the wrong telephone call. Practical systems must try to detect a speech recognition error and reject a speech recognition result when the result is not reliable. Prior systems have derived rejection information from acoustic model level data, language model level data and parser level data. Such data requires a good deal of processing power, which increases expense of practical implementations and adds difficulty in achieving real time operation.

BRIEF DESCRIPTION OF THE DRAWINGS

The invention is illustrated by way of example, and not limitation, in the figures. Like reference numerals denote like elements in the various figures.

DETAILED DESCRIPTION OF THE INVENTION

Figure 1:
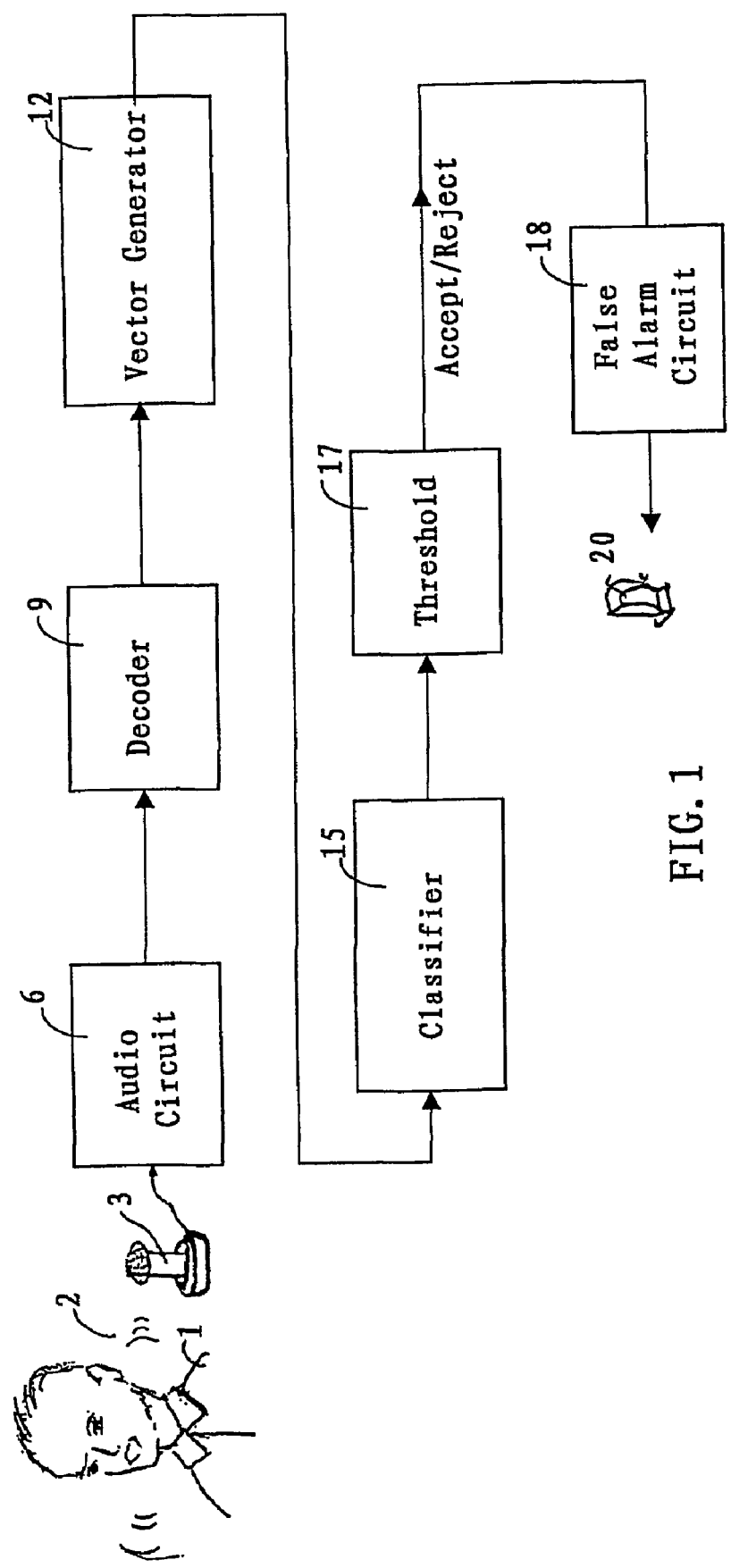
FIG. 1 is a block diagrammatic representation of a system incorporating the present invention.

FIG. 1 is a block diagrammatic representation of a system comprising the present invention. In the example of FIG. 1, a user 1 wishes to make a hands-free call, and speaks into a microphone 3 via sound waves 2. The microphone 3 may be included in a hands-free telephone or other device. The microphone 3 converts the voice of the user 1 into electrical signals processed by an audio circuit 6.

Speech signals from the audio circuit 6 are indicative of the sounds voiced by the user 1, and are decoded by a decoder 9. Many forms of a decoder 9 are used in the art. As described above, a decoder 9 utilizes a model after a training operation has been performed. The audio circuit 6 and a decoder 9 maybe provided, for hands-free telephone applications in the environment of voice processing circuit boards. One example of a voice processing circuit board is the model D/41EPCI4-PCI voice processor made by Dialogic Corporation. This circuit board is a 4 port analog voice processing board incorporating an architecture known under the trademark Signal Computing System Architecture™ (SCSA™). Particular inputs provided and outputs generated in accordance with the present invention are further discussed below. A particular circuit board cited above allows interaction of the basic circuit software and hardware with additional boards. Consequently, a prior art circuit may be straightforwardly modified in accordance with the present invention.

The present system is directed toward recognizing names. Full sentences will not be resolved from the audio input. Consequently, no language model will be used during decoding. Similarly, no parser is used after decoding. Therefore, language models and parser information will not be used to provide information in confidence scoring. What is being provided from the decoder 9 is output indicative of acoustic level information, namely phone and word level features. Processing is, therefore, simplified.

The basic phone feature is p(x|u), which is the probability that information based on a number of speech frames x corresponds to a particular model u of a given phone. In a preferred form, the decoder also generates the basic level word score p(x|w) which is the likelihood that a certain group of frames x represents a word w. Individual phonemes do not work well is practice as units on which to base recognition because there is too much variation due to articulatory effect from adjacent sounds. Since only acoustic level information is being obtained, further terms must be generated on which an approximation of p(x|u) can be based. A "standard" feature set used for many speech recognizers is a 39 dimensional feature vector consisting of 12 mel frequency cepstral coefficients normalized log energy, $\Delta$ and $\Delta\Delta$ coefficients. The cepstrum separates vocal tract parameters from their exitation signal. Lower order coefficients in the cepstrum represent slowly varying vocal tract parameters and remaining coefficients model the quickly varying exitation signal and pitch. Speech recognition is generally only interested in the first 13 ceptsral coefficients. Lower order coefficients are often omitted in favor of the energy measures of the higher orders. In the present embodiment, the twelfth order coefficients are included in the calculations of the decoder 9. Mel-frequency cepstral coefficients approximate the critical band of the human auditory system by warping the frequency access prior to linear transform.

The front end of a speech recognizer represents only a portion of the computational power needed to obtain results with a known confidence level. Therefore, in accordance with the present invention, further measures are generated which may be efficiently utilized for deriving further features at the work level. These features may be processed in a computationally efficient manner. These features are generated by a vector generator 12 which receives input from the decoder 9. These inputs are described in greater detail with respect to FIG. 2.

The vector generators are provided to a classifier 15 which is a confidence measure feature vector classifier. The classifier 15 may be an artificial neural network (ANN). Alternatively, the classifier 8 could comprise Linear Discriminant Analysis (LDA) linear classifier. It has been found that the ANN is preferred.

In each type of classifier 15, confidence feature vectors are reduced to one dimension. This one dimensional vector is provided as an output of the classifier 15 to a threshold circuit 17. An accept/reject threshold T is defined and embodied in the threshold circuit 17. If the output of the classifier 15 equal to or greater than T, an accept signal is provided by the threshold circuit 17. If the output of the classifier 15 is less than T, then a reject signal is provided by the threshold circuit 17.

For name dialing, a false alarm is more troublesome than a false accept. Therefore, the system is optimized to reject as many misrecognized and out of vocabulary words as possible while keeping the false alarm rate at a low level. A working level is set at a false alarm rate of less than 5%. To further reduce false alarms, in a preferred form, the system is configured to provide a prompt from a false alarm circuit 18 providing an output to a speaker 20 that provides aural information to the user 1. On a first rejection of a word, false alarm circuit 18 is triggered to provide an output to the user 1, such as by the speaker 20, prompting the speaker to repeat the name corresponding to the keyword associated with the number to be called. The user than says the name again. If a reject signal is again provided by the threshold circuit 17, the user is informed to use manual service rather than automatic dialing to reach a particular party.

In one exemplification, an auto-attendant system was provided having a vocabulary of hundreds of words. A large vocabulary continuous speech recognition (LVCSR) from Intel modified as disclosed above was provided. Speech feature vectors included 12 MFCC, 12 $\Delta$ and 12 $\Delta\Delta$. Cepstral Mean Subtraction (CMS), Variance Normalization (VN) and Vocal Tract Normalization (VTN) were not used. Confidence measure vectors for training, cross-validation and testing data were obtained over a six month period. There were 11,147 utterances for training, 1,898 utterances for cross-validation and 998 utterances for testing. The working point set was with a false alarm rate of less than or equal to 5%. Results were as follows:

| Data Sets | False Alarm | Correct Reject |
|---|---|---|
| Training | 0.0449 | 0.5114 |
| Develop | 0.0355 | 0.5096 |
| Test | 0.0443 | 0.5295 |

These vectors are also known as evidence vectors. Values developed by the vector generator 12 are described. The definitions below comprise instructions to those skilled in the art to produce the proper coding in accordance with known principals in specific languages. One such suitable language is C++. The following are derived Mean_nscore: The mean of normalized log scores of all phonemes in the first choice word, divided by frame number.

Mean_log_nscore: The mean of normalized log scores of all phonemes in the first choice word divided by frame number.

Minimum_log_nscore: The minimum normalized phoneme log score from all phonemes in the first choice word, divided by frame number.

Dev_log_nscore: The standard deviation of phoneme normalized scoresof all phonemes in the first choice word, divided by frame number.

In a further embodiment, the following values are also derived

Align_W_Nbest_Rate: The rate of first choice keyword appears in the N-best hypotheses with same word end time.

W_Nbest_Rate: The rate of first choice keyword appears in the N-best hypotheses, time alignment is not required, because there is only one keyword.

Begin_W_Active_States: The number of active states at beginning frame of first choice keyword.

End_W_Active_States: The number of active states at ending frame of first choice keyword.

W_Active_States: The average number of active states across frames of first choice keyword.

Phone_duration: The average duration of all phones in first choice keyword.

The first choice word is any word within the vocabulary embodied in the decoder 9 recognized as being the model most closely corresponding to the sequence of phones resolved by the decoder 9.

Further useful features can also be obtained by appropriate programming of the vector generator 12 namely:

Align_W_Nbest_Rate: The rate of first choice keyword appears in the N-best hypotheses with same word end time.

W_Nbest_Rate: The rate of first choice keyword appears in the N-best hypotheses, time alignment is not required, because there is only one keyword.

Begin_W_Active_States: The number of active states at beginning frame of first choice keyword.

End_W_Active_States: The number of active states at ending frame of first choice keyword.

W_Active_States: The average number of active states across frames of first choice keyword.

Figure 2:
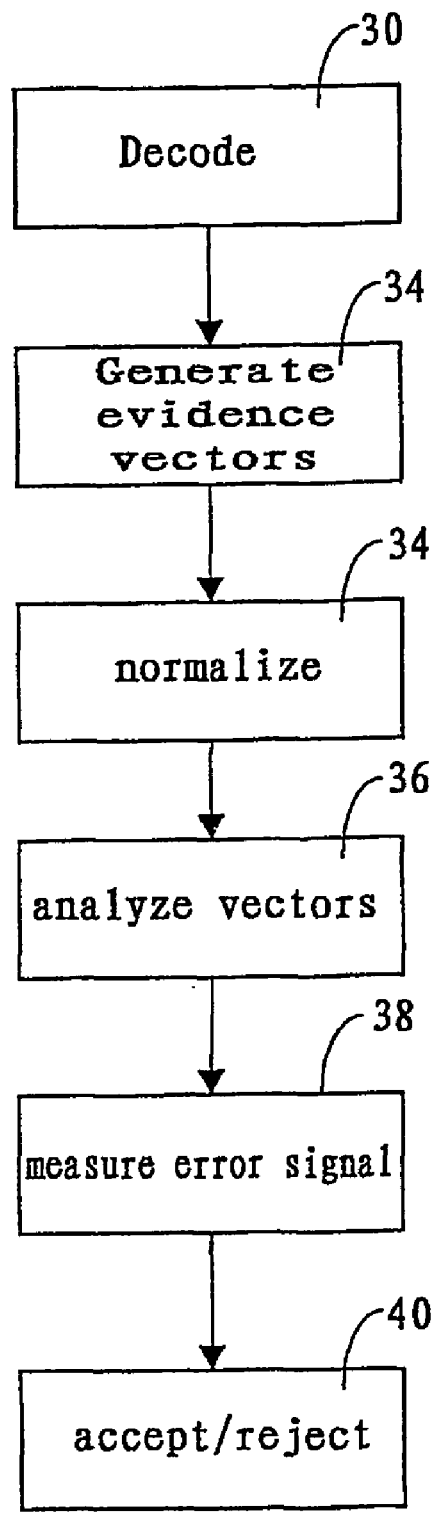
FIG. 2 is a block diagrammatic representation of the method of the present invention which also serves to illustrate the computer program product of the present invention.

A summary of operation is seen in FIG. 2, which illustrates the method and computer product of the present invention. Decoding is performed at block 30. At block 32, vectors are generated by the vector generator 32 where they may be also normalized as at block 34 vectors are analyzed, block 36, by the classifier 15, which is provided to the threshold ciruit 17, at block 38, which may comprise a switch to trigger acceptance or rejection at block 40.

What is thus provided is a computationally efficient, robust method and apparatus for rejection of unreliable speech recognition results. Effective results are obtained without having to use computational resources needed for processing based on the incorporation of word recognition models. In accordance with the above teachings, a number of different parameters may be utilized in the generation of a confidence signal while not departing from the present invention. The preferred embodiments as set forth herein are illustrative and not limiting.

What is claimed is:

1. A system for rejection of unreliable speech recognition results comprising:
    a speech recognition decoder to provide phone and word level information based upon an audio input;
    a speech information processor being programmed to produce phone and word parameters; and
    a neural network classifier to receive evidence vectors and to calculate error signals, said neural network providing error signals comprising confidence information on which a word rejection decision may be based.

2. The system according to claim 1 further comprising a threshold circuit for receiving the error signals from said neural network classifier and comparing the value thereof to a predetermined level for providing a signal indicative of acceptance or rejection of a word.

3. The system according to claim 2 further comprising a rejection switch to reject said word in response to an output from said threshold circuit indicative of a determination of rejection.

4. The system according to claim 1 wherein said decoder embodies speech modeling to utilize 12 MFCC, 12 $\Delta$ and 12 $\Delta\Delta$ values and wherein cepstral mean subtraction, variance normalization and vocal track normalization are not included in the speech vector.

5. The system according to claim 4 wherein said speech information processor is configured to compute
    Mean_nscore: The mean of normalized log scores of all phonemes in the first choice work, divided by frame number;
    Mean_log_nscore: The mean of normalized log scores of all phonemes in the first choice work divided by frame number;
    Minimum_log_nscore: The minimum normalized phoneme log score from all phonemes in the first choice word, divided by frame number; and
    Dev_log_nscore: The standard deviation of phoneme normalized scores of all phonemes in the first choice word, divided by frame number.

6. The system according to claim 5 wherein said speech information processor is also configured to compute:
    Align_W_Nbest_Rate: The rate of first choice keyword appears in the N-best hypotheses with same word end time;
    W_Nbest_Rate: The rate of first choice keyword appears in the N-best hypotheses, time alignment is not required, because there is only one keyword;
    Begin_W_Active_States: The number of active states at beginning frame of first choice keyword;
    End_W_Active_States: The number of active states at ending frame of first choice keyword;
    W_Active_States: The average number of active states across frames of first choice keyword; and
    Phone_duration: The average duration of all phones in first choice keyword.

7. A method comprising:
    decoding phonemes resolved from a speech input measuring the probability $p(x)$ that the decoder has determined a phoneme based on a preselected acoustical model;
    generating evidence parameters;
    normalizing said evidence parameters; and
    calculating error signals based upon said evidence vectors.

8. A method according to claim 7 wherein computing evidence parameters comprises generating the phoneme parameters:
    Mean_nscore: The mean of normalized log scores of all phonemes in the first choice work, divided by frame number.
    Mean_log_nscore: The mean of normalized log scores of all phonemes in the first choice work divided by frame number;
    Minimum_log_nscore: The minimum normalized phoneme log score from all phonemes in the first choice word, divided by frame number; and
    Dev_log_nscore: The standard deviation of phoneme normalized scores of all phonemes in the first choice word, divided by frame number.

9. A method according to claim 8 further comprising measuring a probability of correct detection of a word based on acoustical model, the word comprising a sequence of phonemes;
    normalizing said probability; and
    calculating evidence vectors comprising word parameters and utilizing said word parameters in addition to said phoneme parameters to generate error signals.

10. A method according to claim 9 wherein calculating word parameters comprises calculating
    Align_W_Nbest_Rate: The rate of first choice keyword appears in the N-best hypotheses with same word end time;
    W_Nbest_Rate: The rate of first choice keyword appears in the N-best hypotheses, time alignment is not required, because there is only one keyword;
    Begin_W_Active_States: The number of active states at beginning frame of first choice keyword;
    End_W_Active_States: The number of active states at ending frame of first choice keyword;
    W_Active_States: The average number of active states across frames of first choice keyword; and
    Phone_duration: The average duration of all phones in first choice keyword.

11. A method according claim 10 further comprising taking said error signals and rejecting or not rejecting input indicative of a word in accordance with a level of an error signal associated with the resolved word.

12. A computer program product comprising:
    a computer usable medium having computer readable program code embodied in said medium to utilize audio inputs to produce a probability indicative of measurement of a phoneme;
    computer readable program code to cause the computer to produce error vectors based on calculated evidence parameters calculated from said probability signal; and computer readable program code to cause said computer to provide an error signal value on which acceptance or rejection of a measure phoneme is based.

13. A computer according to claim 12 wherein said computer readable program code comprise means for calculating Mean_nscore: The mean of normalized log scores of all phonemes in the first choice work, divided by frame number;

Mean_log_nscore: The mean of normalized log scores of all phonemes in the first choice work divided by frame number;

Minimum_log_nscore: The minimum normalized phoneme log score from all phonemes in the first choice word, divided by frame number; and Dev_log_nscore: The standard deviation of phoneme normalized scores of all phonemes in the first choice word, divided by frame number.

14. A computer program product according to said claim 13 further comprising computer readable program code to cause a computer to produce a probability of a measured word according to an acoustic model based on a sequence of phonemes and wherein said computer readable program code means to determine phoneme parameters further comprises computer readable code for determining word parameters.

15. A computer program product according to said claim 13 wherein said computer readable program code for generating word parameters comprises means to generate the following values Align_W_Nbest_Rate: The rate of first choice keyword appears in the N-best hypotheses with same word end time;

W_Nbest_Rate: The rate of first choice keyword appears in the N-best hypotheses, time alignment is not required, because there is only one keyword;

Begin_W_Active_States: The number of active states at beginning frame of first choice keyword;

End_W_Active_States: The number of active states at ending frame of first choice keyword;

W_Active_States: The average number of active states across frames of first choice keyword; and Phone_duration: The average duration of all phones in first choice keyword.

16. A computer program product according to claim 15 wherein the computer program code medium is embodied in a circuit providing vectors to a neural network classifier.

* * * * *